United States Patent [19]

Hollstein

[11] Patent Number: 5,581,235
[45] Date of Patent: Dec. 3, 1996

[54] TURN SIGNAL CONTROL SYSTEM

[75] Inventor: Jürgen Hollstein, Mannheim, Germany

[73] Assignee: Deere & Company, Moline, Ill.

[21] Appl. No.: 501,349

[22] Filed: Jul. 12, 1995

[30] Foreign Application Priority Data

Aug. 11, 1994 [DE] Germany .......................... 44 28 369.5

[51] Int. Cl.⁶ .................................................... B60Q 1/40
[52] U.S. Cl. .......................... 340/477; 340/475; 340/476
[58] Field of Search ...................................... 340/475, 476, 340/477, 309.4

[56] References Cited

U.S. PATENT DOCUMENTS

| | | | |
|---|---|---|---|
| 3,555,506 | 1/1971 | Daws | 340/477 |
| 3,555,507 | 1/1971 | Burson, Jr. | 340/477 |
| 3,925,758 | 12/1975 | Holt | 340/476 |
| 4,333,071 | 6/1982 | Kira et al. | 340/477 |
| 4,358,751 | 11/1982 | Roudebush, Jr. | 340/477 |
| 4,907,844 | 3/1990 | White | 340/477 |
| 4,972,174 | 11/1990 | Onan et al. | 340/477 |
| 5,414,407 | 5/1995 | Gerrans et al. | 340/477 |
| 5,438,314 | 8/1995 | Evans | 340/477 |
| 5,486,809 | 1/1996 | Wadlington, Jr. | 340/475 |

FOREIGN PATENT DOCUMENTS

| | | |
|---|---|---|
| 2728061 | 1/1979 | Germany . |
| 2724275 | 8/1984 | Germany . |
| 3442205 | 5/1986 | Germany . |
| 4238538 | 5/1994 | Germany . |
| WO9533633 | 12/1995 | WIPO . |

OTHER PUBLICATIONS

Research Disclosure: Nr. 283, Nov. 1987, New York, Seite 645 XP002002313, Declaire: "Turn Signal Cancellation With Vehicle Speed Controlled Angle".

*Primary Examiner*—Jeffery Hofsass
*Assistant Examiner*—Daniel J. Wu

[57] ABSTRACT

A control system controls the vehicle having turn signal lights mounted on both sides of the vehicle in response to deflection of a manually operated turn signal. The control system includes a control unit which senses vehicle speed and automatically interrupts a flashing mode after a flashing duration which is dependent upon the sensed vehicle speed. The turn signal control unit shuts off the flashing mode in response to deflection of the turn signal lever only for a brief time period and enables the flashing mode in response to deflection of the turn signal lever for a period of time which is longer than a pre-set time period. The control unit prevents cancellation of the flashing mode in response to a repeat deflection of the turn signal lever only for the brief time period. The control unit also cancels a first flashing mode associated with deflection of the turn signal lever in a first direction and enables a second flashing mode associated with deflection of the turn signal lever in a second direction in response to brief deflection of the turn signal lever in a second deflection direction. The control unit maintains operation of the flashing mode in response to deflection of the lever for a period of time longer than a pre-set time period.

8 Claims, 2 Drawing Sheets

TURN SIGNAL CONTROL SYSTEM

BACKGROUND OF THE INVENTION

The invention relates to a turn signal control system for a vehicle with turn signal lights attached to both sides of the vehicle, with a manually operated turn signal lever and with a turn signal control unit. The turn signal control unit activates a flashing mode upon deflection of the turn signal lever out of a neutral position into a first deflected position. In the flashing mode the turn signal lights associated with the deflected direction of the lever flash on and off. Furthermore, the turn signal control unit is provided with means for shutting off of the flashing mode.

Passenger vehicles, in particular, are equipped with systems for the shut-off of the turn signals, which mechanically return the turn signal lever to the neutral position, as soon as the steering wheel is returned from the deflected position for operation around a curve to the straight-ahead position. Furthermore, a steering column switch has become known from published German patent application 2728061, published 18 Jan. 1979, in which the flasher return occurs without mechanical contact where reed contacts are released by means of permanent magnets arranged on the steering column. Shut-off systems of this type can lead to a premature or a delayed shut-off of the turn signal in hydraulic steering systems which are frequently applied to agricultural and industrial vehicles and in which no fixed relationship exists between the steering wheel position and driving wheel deflection, and are therefore not always appropriate.

If the shut-off of the turn signal is automatic after a predetermined time interval, this can lead to a premature interruption of the flashing mode if the vehicle is moving slowly, or is waiting, for example, for a traffic light. The application of steering angle sensors to the control of the shut-off is relatively costly and has the disadvantage that the system can respond to steering movements that do not mark the end of the turning process.

A turn signal control system for a motorcycle is described in U.S. Pat. No. 4,972,174, issued 20 Nov. 1990 to Onan, et al. With this control system the turn signals are flashed for a period of time based upon sensed speed. But, this system includes separate left and right turn signal buttons, not a single lever. Also, this system does not include different flashing modes which can be selected depending upon how long an actuator is actuated.

SUMMARY OF THE INVENTION

Accordingly, an object of this invention is to provide a turn signal control system which avoids a premature or a delayed shut-off of the turn signal.

A further object of the invention is to provide such a turn signal control system which can be attained technically through simple, cost effective means.

These and other objects are achieved by the present invention, wherein a turn signal control system permits the automatically shuts off a turn signal flashing mode after a certain time period in response to a short-term actuation of the turn signal lever. For this purpose the turn signal lever need only be deflected briefly. It may also be moved to a detent position, but then must be returned to its neutral position within a short time interval, for example, one second. This deflection time interval which causes shut-off of the flashing mode is preferably at least 0.1 second and, at most, 1 second.

If the turn signal lever remains in the deflected position for a longer period of time, then the flashing mode remains engaged only as long as the turn signal lever is in the deflected position (normal flasher operation). In normal flasher operation the turn signal remains active until the turn signal lever is returned to its neutral position.

If the turn signal lever is briefly deflected, then the control unit actuates the flashing mode for a duration which is a function of the sensed vehicle speed. When the vehicle is moving slowly the flashing mode duration is relatively long, whereas, when the vehicle is moving rapidly the flashing mode duration is relatively short.

Preferably, during time periods when the flashing mode is not operative, the flashing mode duration is continuously adjusted according to the sensed vehicle speed, so that the system can react to any changes in the vehicle speed and impose an appropriate flashing duration the next time the lever is deflected.

The control unit will also shut off the flashing mode before the end of the normal flashing duration in response to an additional deflection of the turn signal lever to the first deflected position.

Furthermore, he control unit will also shut off the flashing mode when the turn signal lever is moved to a second deflected position. If the turn signal lever is only briefly deflected to a second deflected position, then the flashing mode associated with the first deflection is terminated and a flashing mode associated with the second deflection is activated. If the turn signal lever is deflected for a longer period of time, the normal flashing mode is activated and will not be shut-off.

In order to make the operator aware of the duration of the flashing mode it is advantageous to generate an acoustic signal during the entire operation of the flashing mode in the frequency of the flasher rhythm and which is automatically ended when the turn signal lights are extinguished. Furthermore, indicator lights in the vehicle cab can reproduce the direction and flasher frequency.

DETAILED DESCRIPTION

Figure 1:
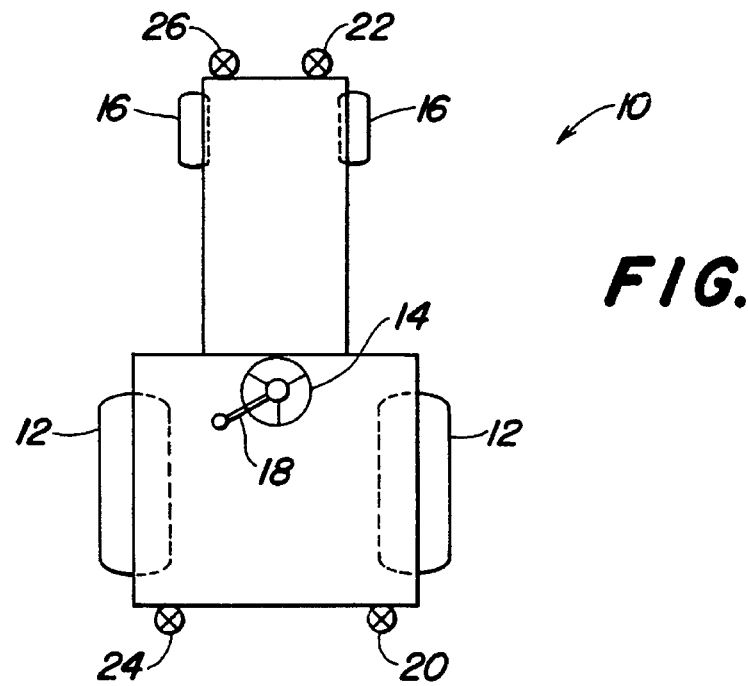
FIG. 1 shows a schematic side view of a tractor with turn signal lights.

The tractor 10 shown in FIG. 1 contains two driven rear wheels 12, two steerable front wheels 16 controlled by a steering wheel 14, a turn signal lever 18 and a rear and a front right turn signal light 20, 22 as well as a rear and a front left turn signal light 24, 26.

Figure 2:
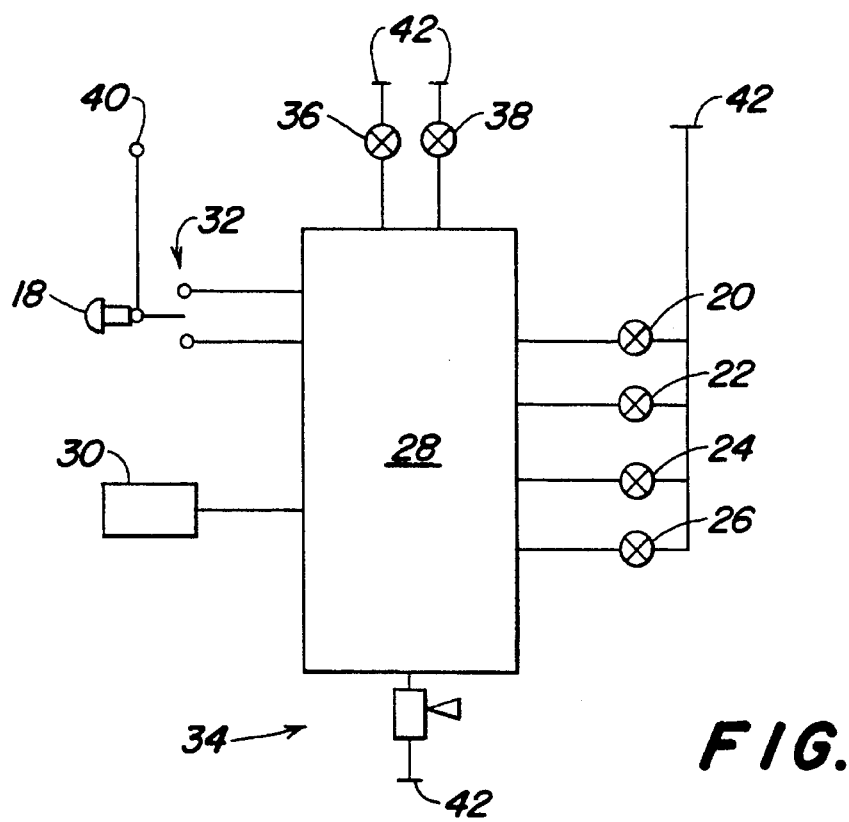
FIG. 2 shows the circuit diagram of a turn signal according to the invention.

As can be seen in FIG. 2, an electronic control unit 28 is electrically connected to the right and left turn signal lights 20, 22, 24, 26, a velocity sensor 30, a switch 32 that can be actuated by the turn signal lever 18, an acoustic signaling device 34, a right signal light 36 and a left signal light 38. The switch 32 is connected to a voltage source 40 and the turn signal lights 20, 22, 24, 26 (also called flasher lights) as well as the acoustic signaling device 34 and the signal lights 36, 38 are connected to the vehicle chassis 42.

The control unit 28 is a programmable electronic control unit with fixed memory (not shown) which contains a flasher frequency generator with a frequency of, for example, 90 impulses per minute and control relays for the right and left turn signal lights 20, 22, 24, 26. The switch 32 is a selector switch with detent position that can be moved from its center position as shown to two deflected positions (right and left) and in which it is retained in a catch (not shown) until manually returned to the neutral position. The velocity sensor 30 is attached in the usual manner to the rear axle (not shown) of the vehicle.

Figure 3:
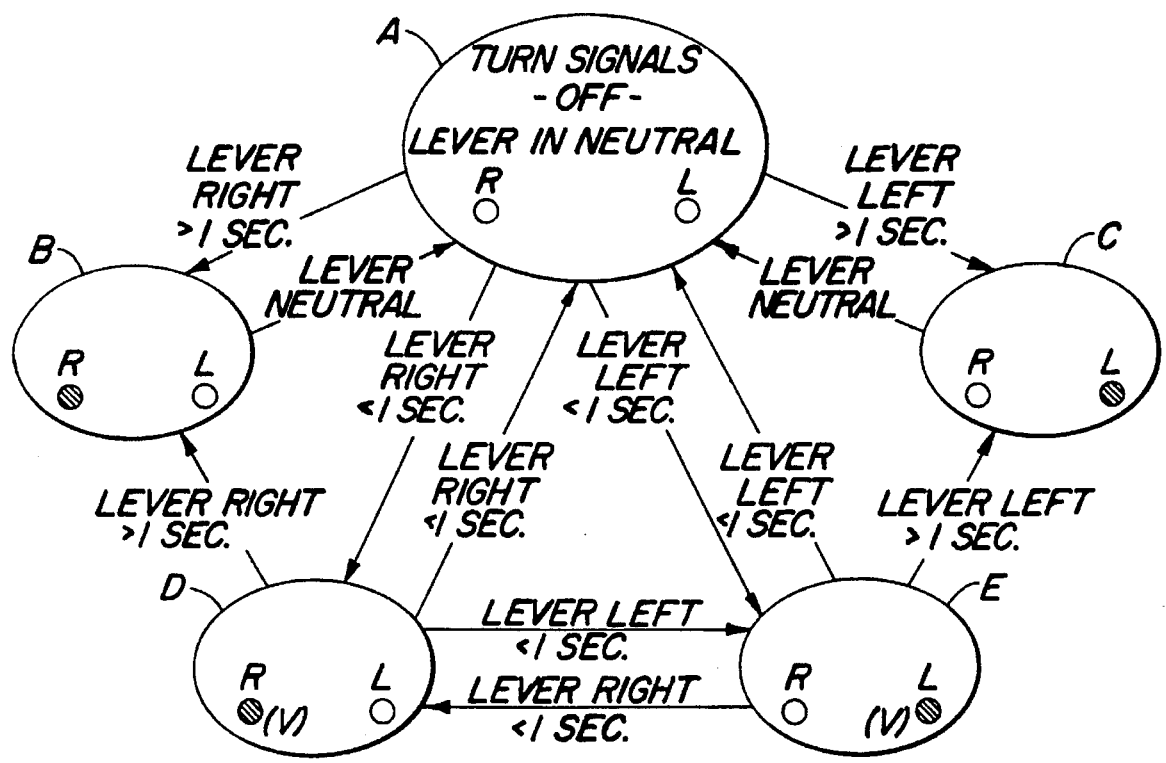
FIG. 3 shows a condition diagram of the turn signal control unit.

On the basis of the position of the switch 32 and of the sensed velocity, the control unit 28 controls the turn signal lights 20, 22, 24, 26. Referring now to the condition diagram of FIG. 3, the system may be in any of the five conditions or states indicated by letters A, B, C, D and E. The system may be converted from one state to another as indicated by the arrows shown in FIG. 3 in response to a corresponding manipulation of the turn signal lever 18. In FIG. 3 the right turn signal lights 20, 22 are indicated as R, the left turn signal lights 24, 26 are indicated as L. The small empty circles indicate that the turn signal lights R, L are off, the filled circles indicate that the turn signal lights R, L are flashing with a pre-determined rhythm and the filled circles with the symbol "(v)" indicate that the turn signal lights R, L are flashing and the shut-off mode has been activated, so that the turn signal lights R, L are extinguished after a pre-determined flashing duration.

Condition A is the basic condition, in which the turn signal lever 18 is in its central, neutral position and all turn signal lights R, L are extinguished. By an actuation of the turn signal lever 18 to the right lasting for more than one second, a transition to condition B occurs, in which only the right turn signal lights R are flashing. If the turn signal lever 18 again returns to its neutral position, then the basic condition A is resumed and the right turn signal lights R are extinguished. Correspondingly, an actuation of the turn signal lever 18 to the left for a longer duration of time results in a transition to condition C, in which only the left turn signal lights L are flashing as long as the turn signal lever 18 is in its left position.

If the turn signal lever 18 is moved from its neutral position into its right position only briefly (longer than 0.1 second but less than 1 second) then the system converts or transitions from condition A to condition D. In condition D the right turn signal R flashes for a flashing duration which is dependent upon the vehicle speed as explained in the next paragraph. After the flashing duration expires, the right turn signal lights R are extinguished.

The turn signal control unit determines the flashing duration, T, (in seconds) on the basis of the following equation:

$$T=Tp+(Tv/(W+V)), \quad (1)$$

where Tp, Tv and W are pre-set constants, and V is the sensed vehicle speed in Km/hour. For an agricultural tractor the constants may, for example, assume the following values: Tp=60, Tv=120 and W=1. Thereby, the minimum flashing duration is 1 minute, and the maximum flashing duration is 3 minutes, such as when the vehicle is standing still. This above equation (1) can be derived from the definition of velocity. Tp represents a minimum flasher duration, while a positive value of W avoids a division by zero when the vehicle is standing still.

The system can be taken out of condition D at any time by deflecting the turn signal lever 18 out of its neutral position. The system will be converted to condition B (which has been previously described) by a longer (more than 1 second) deflection of the turn signal lever 18 to the right. It will be returned to its basic condition A by a brief (less than 1 second) deflection of the turn signal lever 18 to the right. In response to a brief (less than 1 second) deflection of the lever 18 to the left the system converted to a condition E, in which the right turn signal lights R are off and the left turn signal lights L are flashing for a flashing duration which depends on the vehicle speed (as previously explained with respect to condition D), after which the left turn signal lights L are extinguished.

If the system is in the basic condition A and the turn signal lever 18 is deflected to the left from its neutral position only briefly (longer than 0.1 second, but less than 1 second) then the system converts to the aforementioned condition E.

The system can be converted from condition E at any time by deflecting the turn signal lever 18 from its neutral position. The system will be converted to the previously described condition C is by a longer (more than 1 second) deflection of lever 18 to the left. The system will be returned to its basic condition A by a brief (less than 1 second) deflection of lever 18 to the left. The system will be converted to the previously described condition D by a brief (less than 1 second) deflection of lever 18 to the right.

Simultaneously with the activation of a flashing mode the control unit 28 energizes an acoustic signaling device 34 and a right or a left signal light 36, 38 on the instrument console in the vehicle cab, so that the operator receives acoustic as well as visual signals for the duration of the flashing period in the frequency of the flashing mode.

Preferably, the duration of the flashing mode may be a manually programmable step function of the vehicle speed.

As an alternative to the control based on the equation (1) the control may also be based on a step function. If the shut-off mode is activated by a brief actuation of the turn signal lever 18, then the turn signal lights begin flashing for a certain number of flashing impulses. The number of steps in the step function may, for example, be 20. Thereby, each interval of vehicle speed of, for example, 2 Km/hour is associated with a certain number of flashing impulses. The number of flashing impulses corresponds to a certain duration of flashing.

The flashing impulses are preferably processed in two independent impulse counters (not shown). The first counter (not shown) counts impulses for velocities that are smaller than, for example, 2 Km/hour, while the second counter (not shown) counts impulses for velocities above, for example, 2 Km/hour. When one of the two counters (not shown) has reached the number of flashing impulses that can be determined from the step function then the shut-off mode stops the flashing.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A turn signal control system for a vehicle having turn signal lights mounted on both sides of the vehicle, a manually operated turn signal lever and a turn signal control unit, the turn signal control unit, in response to movement of the turn signal lever from a neutral position to a deflected position, activating a flashing mode in which flashes the turn signal light associated with the deflected position, the turn signal control unit also including means for sensing vehicle speed, and means for automatically terminating the flashing mode after a flashing duration which is dependent upon sensed vehicle speed, the improvement wherein the turn signal control unit comprises:

means for shutting off the flashing mode at the end of the flashing duration in response to deflection of the turn signal lever only for a brief time period; and means for enabling the flashing mode for as long as the lever is deflected in response to deflection of the turn signal lever for a period of time which is longer than a preset time period.

2. The turn signal control system of claim 1, characterized by:

the brief time period is between 0.1 second and 1.0 second.

3. The turn signal control system of claim 1, wherein:

the turn signal control unit comprises means operative when the turn signal lights are not flashing for continuously adjusting the flashing duration as a function of sensed vehicle speed.

4. The turn signal control system of claim 1, wherein the turn signal control unit further comprises:

means for preventing cancellation of the flashing mode in response to a repeat deflection of the turn signal lever only for said brief time period.

5. The turn signal control system of claim 1, wherein the turn signal control unit further comprises:

means for cancelling a first flashing mode associated with deflection of the turn signal lever in a first direction and enabling for a limited time period a second flashing mode associated with deflection of the turn signal lever in a second direction in response to brief deflection of the turn signal lever in a second deflection direction.

6. The turn signal control system of claim 1, wherein the turn signal control unit further comprises:

means for the automatically maintaining operation of a flashing mode in response to deflection of the lever for a period of time longer than a pre-set time period.

7. The turn signal control system of claim 1, wherein the turn signal control unit further comprises:

means for determining the flashing duration according to the following equation:

$$T=Tp+Tv/W+V,$$

where Tp, Tv and W are pre-set constants and V is a sensed vehicle speed.

8. The turn signal control system of claim 1, further comprising:

means for generating an acoustic signal during flashing of one of the turn signal lights.

* * * * *